United States Patent
Ko et al.

(10) Patent No.: US 8,905,185 B2
(45) Date of Patent: Dec. 9, 2014

(54) REDUCER OF ELECTRIC POWER STEERING APPARATUS

(75) Inventors: Bong Sung Ko, Wonju-si (KR); Seong Yoon Kim, Wonju-si (KR); Seung Yong Pyo, Seoul (KR); Sung Jae Yoo, Seoul (KR)

(73) Assignee: Mando Corporation, Gyeonggi-Do (KR)

( * ) Notice: Subject to any disclaimer, the term of this patent is extended or adjusted under 35 U.S.C. 154(b) by 894 days.

(21) Appl. No.: 12/972,999

(22) Filed: Dec. 20, 2010

(65) Prior Publication Data

US 2011/0147113 A1 Jun. 23, 2011

(30) Foreign Application Priority Data

Dec. 23, 2009 (KR) .................. 10-2009-0130142
Dec. 24, 2009 (KR) .................. 10-2009-0130612

(51) Int. Cl.
- *B62D 5/04* (2006.01)
- *F16H 57/039* (2012.01)
- *F16H 57/00* (2012.01)
- *B62D 3/04* (2006.01)
- *F16H 57/022* (2012.01)
- *F16H 57/021* (2012.01)

(52) U.S. Cl.
CPC .......... *F16H 57/0006* (2013.01); *F16H 57/039* (2013.01); *F16H 2057/0222* (2013.01); *F16H 2057/0213* (2013.01); *B62D 5/0409* (2013.01); *B62D 3/04* (2013.01)
USPC ........................................................ 180/444

(58) Field of Classification Search
CPC ...... B62D 5/0409; B62D 5/04; B62D 5/0403; B62D 5/0454; B62D 5/0421
USPC ........................................ 180/444; 74/388 PS
See application file for complete search history.

(56) References Cited

U.S. PATENT DOCUMENTS

| | | | |
|---|---|---|---|
| 6,763,738 B1 | 7/2004 | Tsutsui et al. | |
| 7,188,700 B2 * | 3/2007 | Eda et al. | 180/444 |
| 8,549,945 B2 * | 10/2013 | Rho et al. | 74/388 PS |
| 2004/0245040 A1 * | 12/2004 | Eda et al. | 180/444 |
| 2006/0191738 A1 * | 8/2006 | Eda et al. | 180/444 |
| 2007/0251758 A1 * | 11/2007 | Segawa et al. | 180/444 |

OTHER PUBLICATIONS

Korean Office Action issued in Korean Application No. 10-2009-0130142 dated Jun. 13, 2011.
Chinese Office Action with English translation issued in Chinese Application No. 201010602576.7 dated Aug. 7, 2013.

* cited by examiner

*Primary Examiner* — Tony Winner
(74) *Attorney, Agent, or Firm* — McDermott Will & Emery LLP

(57) ABSTRACT

A reducer of an electric power steering apparatus is disclosed. It reduces rattle noise generated by a backlash due to friction and wear of a worm and a worm wheel or an impact transmitted from a road surface through a wheel and a steering shaft and enhances a steering feeling of a driver by improving the catching phenomenon and rotational resistance generated between a worm shaft and a worm shaft bearing.

15 Claims, 12 Drawing Sheets

REDUCER OF ELECTRIC POWER STEERING APPARATUS

CROSS-REFERENCE TO RELATED APPLICATION

This application claims priority from and the benefit under 35 U.S.C. §19(a) of Korean Patent Application No. 10-2009-0130142 filed on Dec. 23, 2009 and Korean Patent Application No. 10-2009-0130612 filed on Dec. 24, 2009, which are hereby incorporated by reference for all purposes as if fully set forth herein.

BACKGROUND OF THE INVENTION

1. Field of the Invention

The present invention relates to an electric power steering apparatus. More particularly, the present invention relates to a reducer of an electric power steering apparatus that reduces rattle noise generated by a backlash due to friction and wear of a worm and a worm wheel or an impact transmitted from a road surface through a wheel and a steering shaft and enhances a steering feeling of a driver by improving the catching phenomenon and rotational resistance generated between a worm shaft and a worm shaft bearing.

2. Description of the Prior Art

FIG. 1 illustrates a conventional electric power steering apparatus. As illustrated in FIG. 1, the electric power steering apparatus 100 includes a steering wheel 101 disposed in front of a driver's seat, a steering shaft 106 connected to the steering wheel 106, a steering column 130 configured to fix the steering shaft 106 to the chassis of a vehicle, a rack/pinion mechanism 110 including a rack gear and a pinion gear and configured to convert a rotational movement of the steering shaft 106 to a linear movement, and a rack bar 112 whose opposite ends are equipped with a tie rod 122 and a knuckle arm 124 respectively.

The steering column 130 is rotated in conjunction with the steering wheel 102 as the steering shaft 106 is connected to the steering wheel 102, and an end of the steering column 130 is connected to a pinion shaft 108 by means of a pair of universal joints 104. The pinion shaft 108 is connected to the rack bar 112 through the rack/pinion mechanism 110, and opposite ends of the rack bar 112 are connected to wheels of the vehicle through the tie rods 122 and the knuckle arms 124.

An auxiliary power mechanism 140 includes a torque sensor 142 configured to detect a torque applied to the steering wheel 102 by the driver and to output an electrical signal proportional to the detected torque, an electronic control unit configured to generate a control signal based on the electrical signal transmitted from the torque sensor 142, a motor 146 configured to generate auxiliary power based on the control signal transmitted from the electronic control unit 144, and a reducer 150 including a worm 152 and a worm wheel 156 and configured to transmit the auxiliary power generated by the motor 146 to the steering shaft 106.

Thus, the electric power steering apparatus is adapted to transmit the torque generated by rotation of the steering wheel 102 to the rack bar 112 via the rack/pinion mechanism 110 and transmit the auxiliary power generated by the motor 146 to the rack bar 112 according to the generated torque.

That is, the torque generated by rotation of the steering wheel 102 and the auxiliary power generated by the motor 146 together move the rack bar 112 axially.

FIG. 2 is a sectional view illustrating a reducer of the conventional electric power steering apparatus. In the reducer of FIG. 2, a worm shaft 254 has a worm 152 and worm shaft bearings 257 are installed at opposite ends of the worm shaft 254 to support the worm shaft 254, and a plug bolt 210 is coupled to a damping coupler 240 and the worm shaft bearing 257 between them to prevent the worm shaft bearing 257 from moving in the axial direction of the worm shaft 254 and is fixed by a plug nut 220.

The worm shaft 254 is connected to the motor 146 by means of the damping coupler 240 to be rotated by driving the motor 146.

The worm wheel 156 is provided on the outer surface of the worm 152 formed on the worm shaft 154 to be enmeshed with the worm 152. The worm wheel 156 is mounted to the steering shaft 106 by which a rotational force of the steering wheel (102 of FIG. 1) manipulated by the driver is transmitted to transmit a rotational force of the worm shaft 254 generated by driving the motor 146 to the steering shaft 106.

The worm 152 and the worm wheel 156 are installed within the gear housing 260 and a motor 146 for providing a driving force to the worm shaft 254 is installed on one side of the gear housing 260, and the gear housing 260 and the motor 146 are coupled to each other by a bolt 250 using a motor cover 230.

In the above-described reducer of an electric power steering apparatus, the steering operation state of a vehicle can be stably maintained by controlling driving of a motor using an electronic control unit of a vehicle according to a vehicle operation condition and by adding a rotational force of a worm shaft generated by the motor to a rotational force of a steering wheel manipulated by the driver to transmit the resulting rotational force to a steering shaft.

However, in the reducer of the conventional electric power steering apparatus, a manufacturing error and an assembling error are accumulated at a coupling portion of a worm shaft and a motor shaft, causing a catching feeling to a bearing and increasing a rotational resistance of the worm shaft. Further, as a worm and a worm wheel are used, a gap is generated due to wear and rattle noise is generated by a backlash. Moreover, an uncomfortable feeling is caused to the driver during manipulation of the steering wheel due to rattle noise influenced by an impact transmitted from a road surface to wheels and a steering shaft.

SUMMARY OF THE INVENTION

Accordingly, the present invention has been made to solve the above-mentioned problems occurring in the prior art, and the present invention provides a reducer of an electric power steering apparatus that reduces rattle noise generated by a backlash due to friction and wear of a worm and a worm wheel or an impact transmitted from a road surface through a wheel and a steering shaft and enhances a steering feeling of a driver by improving the catching phenomenon and rotational resistance generated between a worm shaft and a worm shaft bearing.

In accordance with an aspect of the present invention, there is provided a reducer of an electric power steering apparatus adapted to absorb vibrations and noise generated by friction and wear during operations of a worm shaft and a worm wheel, comprising: a pair of worm shaft bearings coupled respectively to opposite ends of a worm shaft and configured to support rotation of the worm shaft; a gear housing configured to accommodate a gear mechanism including the worm shaft, the worm shaft bearings, and the worm wheel; and a housing damper to one of the worm shaft bearings coupled to an end of the worm shaft opposite to a connecting portion of a motor shaft and an inner wall of the gear housing therebetween and configured to support an outer race of the worm shaft bearing with an axial resilient force.

In accordance with another aspect of the present invention, there is provided a reducer of an electric power steering apparatus adapted to absorb vibrations and noise generated by friction and wear during operations of a worm shaft and a worm wheel, comprising: a pair of worm shaft bearings coupled respectively to opposite ends of a worm shaft and configured to support rotation of the worm shaft; a gear housing configured to accommodate a gear mechanism including the worm shaft, the worm shaft bearings, and the worm wheel; and a plug damper coupled to one of the worm shaft bearings coupled to an end of the worm shaft on the side of a connecting portion of a motor shaft and a plug bolt coupled to the worm shaft therebetween and configured to support an outer race of the worm shaft bearing with an axial resilient force.

In accordance with still another aspect of the present invention, there is provided a reducer of an electric power steering apparatus adapted to absorb vibrations and noise generated when a worm shaft is moved in an axial direction thereof or resiliently deformed at a certain angle from the axial direction, comprising: a guide configured to axially support a worm shaft bearing coupled to an end of a worm shaft opposite to a coupling portion of a motor shaft; a guide damper coupled to the guide and configured to provide the guide with an axial resilient force; and an adjusting plug coupled to one side of a gear housing 260 so as to pass through the gear housing and configured to adjust a support force of the guide damper while axially supporting the guide damper.

According to the present invention, a reducer of an electric power steering apparatus reduces rattle noise generated by a backlash due to friction and wear of a worm and a worm wheel or an impact transmitted from a road surface through a wheel and a steering shaft and enhances a steering feeling of a driver by improving the catching phenomenon and rotational resistance generated between a worm shaft and a worm shaft bearing.

BRIEF DESCRIPTION OF THE DRAWINGS

The above and other objects, features and advantages of the present invention will be more apparent from the following detailed description taken in conjunction with the accompanying drawings, in which.

The above and other aspects, features and advantages of the present invention will be more apparent from the following detailed description taken in conjunction with the accompanying drawings, in which.

DETAILED DESCRIPTION OF THE PREFERRED EMBODIMENTS

Figure 1:
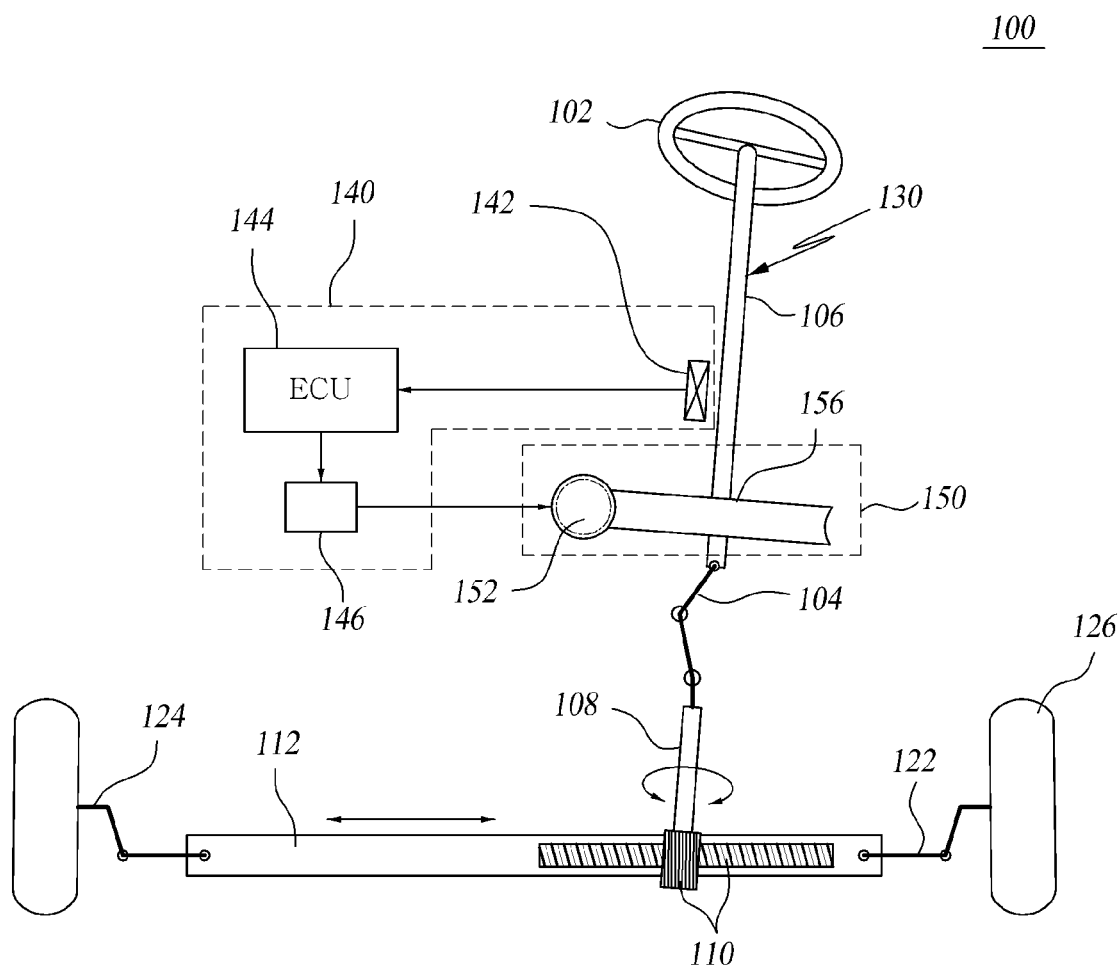
FIG. 1 is a schematic view of a conventional electric power steering apparatus.
Figure 2:
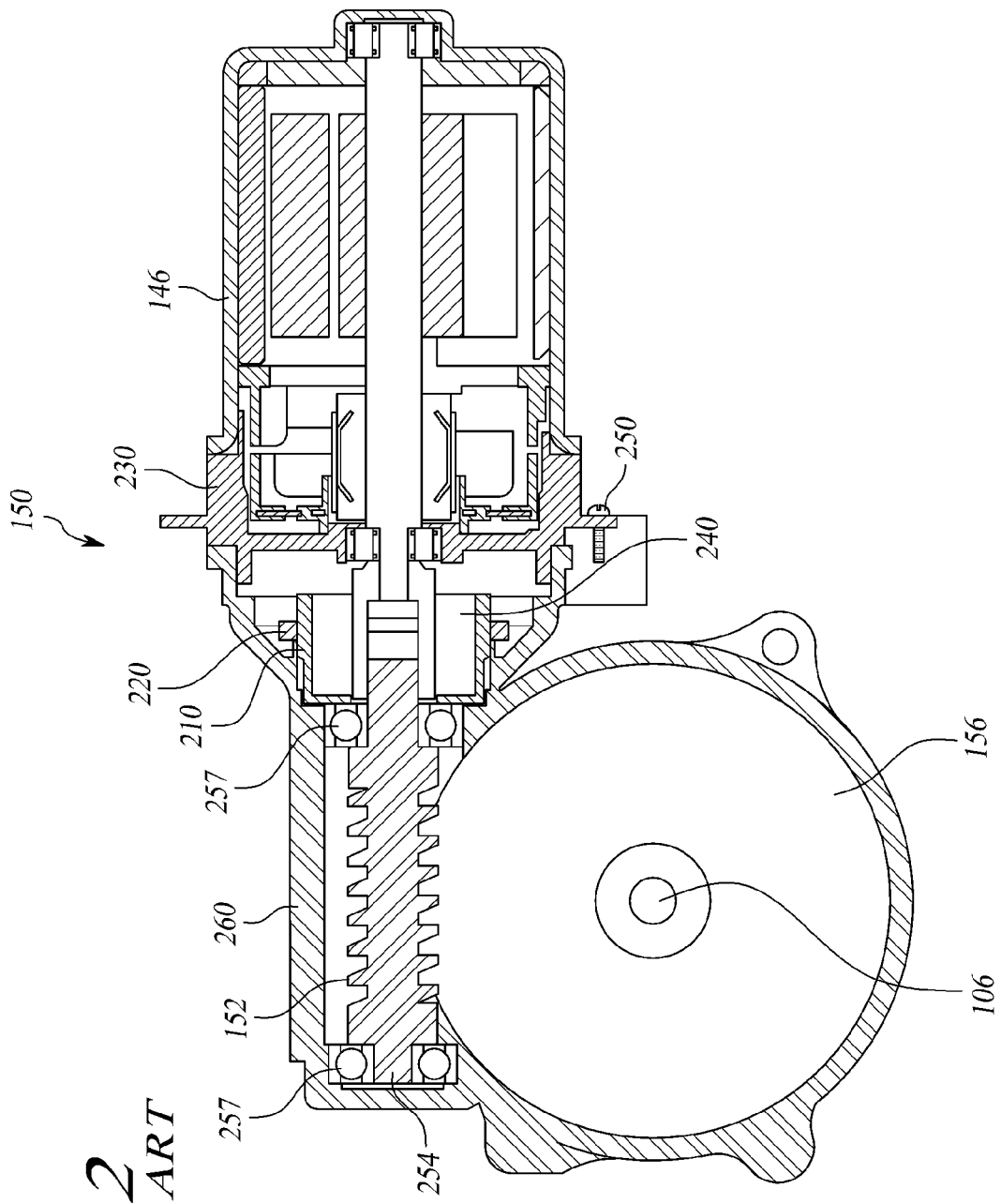
FIG. 2 is a sectional view illustrating a reducer of the conventional electric power steering apparatus.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Figure 3:
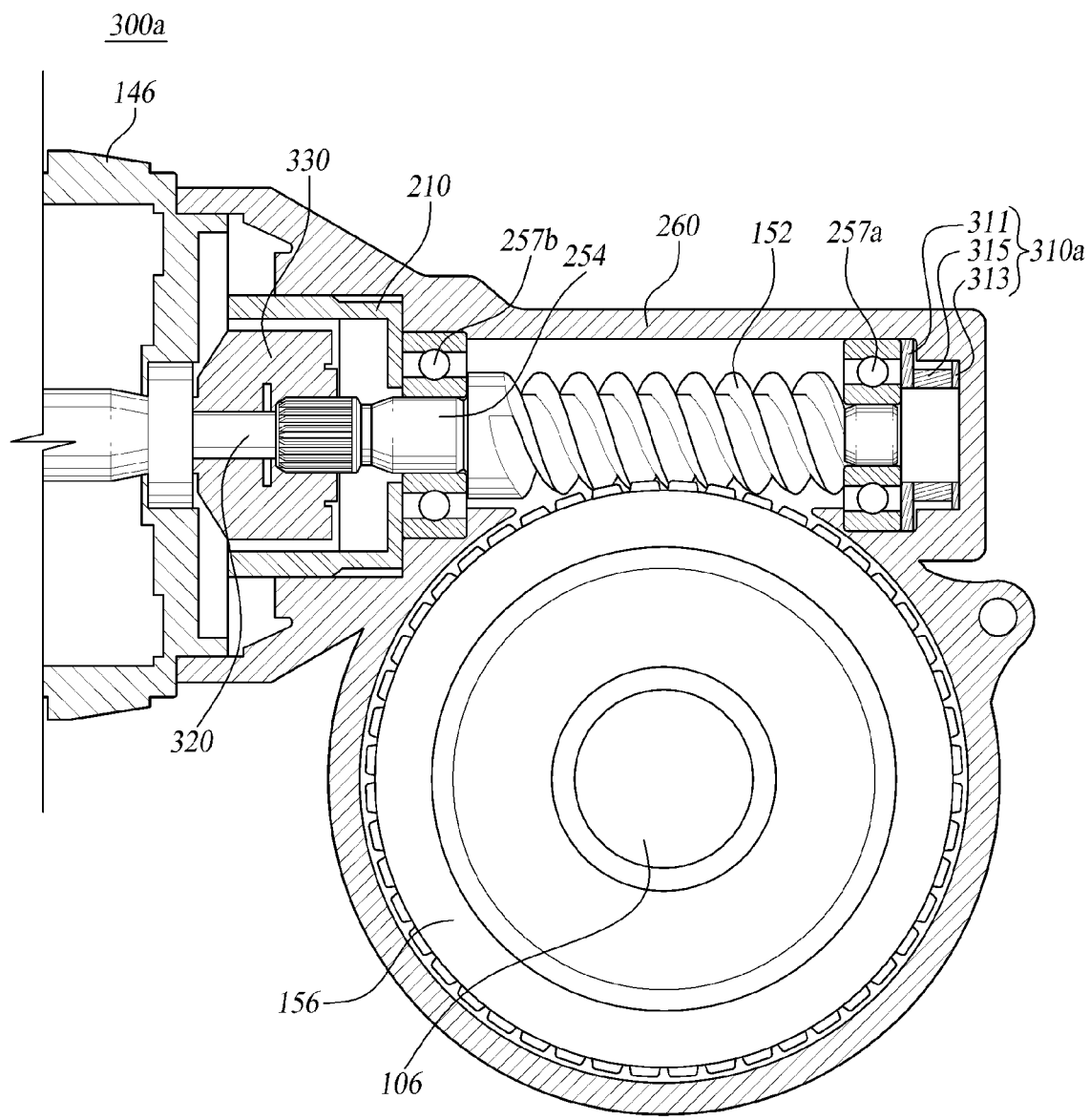
FIGS. 3 to 5 are sectional views illustrating reducers of an electric power steering apparatus according to the first to third embodiments of the present invention.
Figure 4:
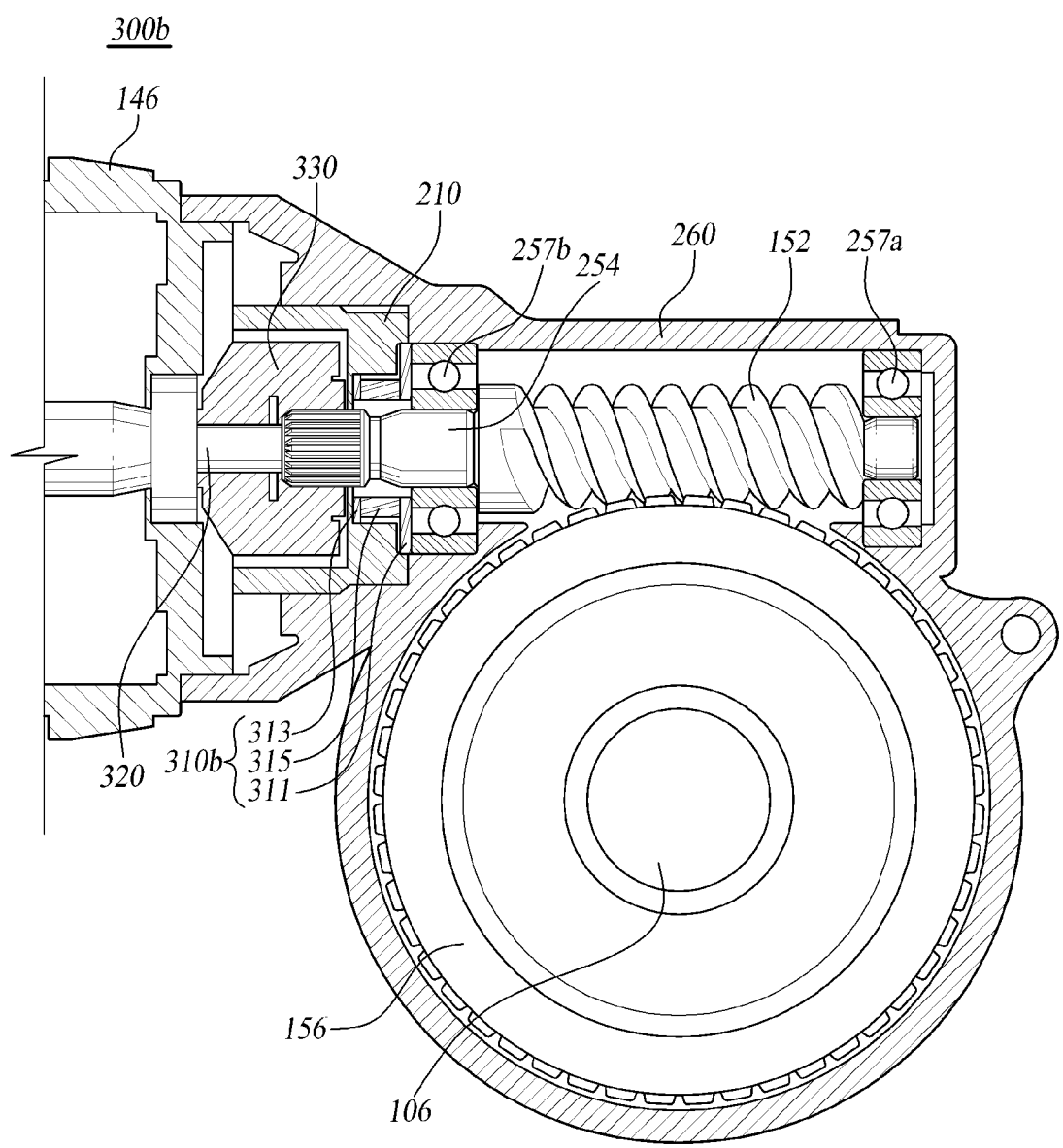
Figure 5:
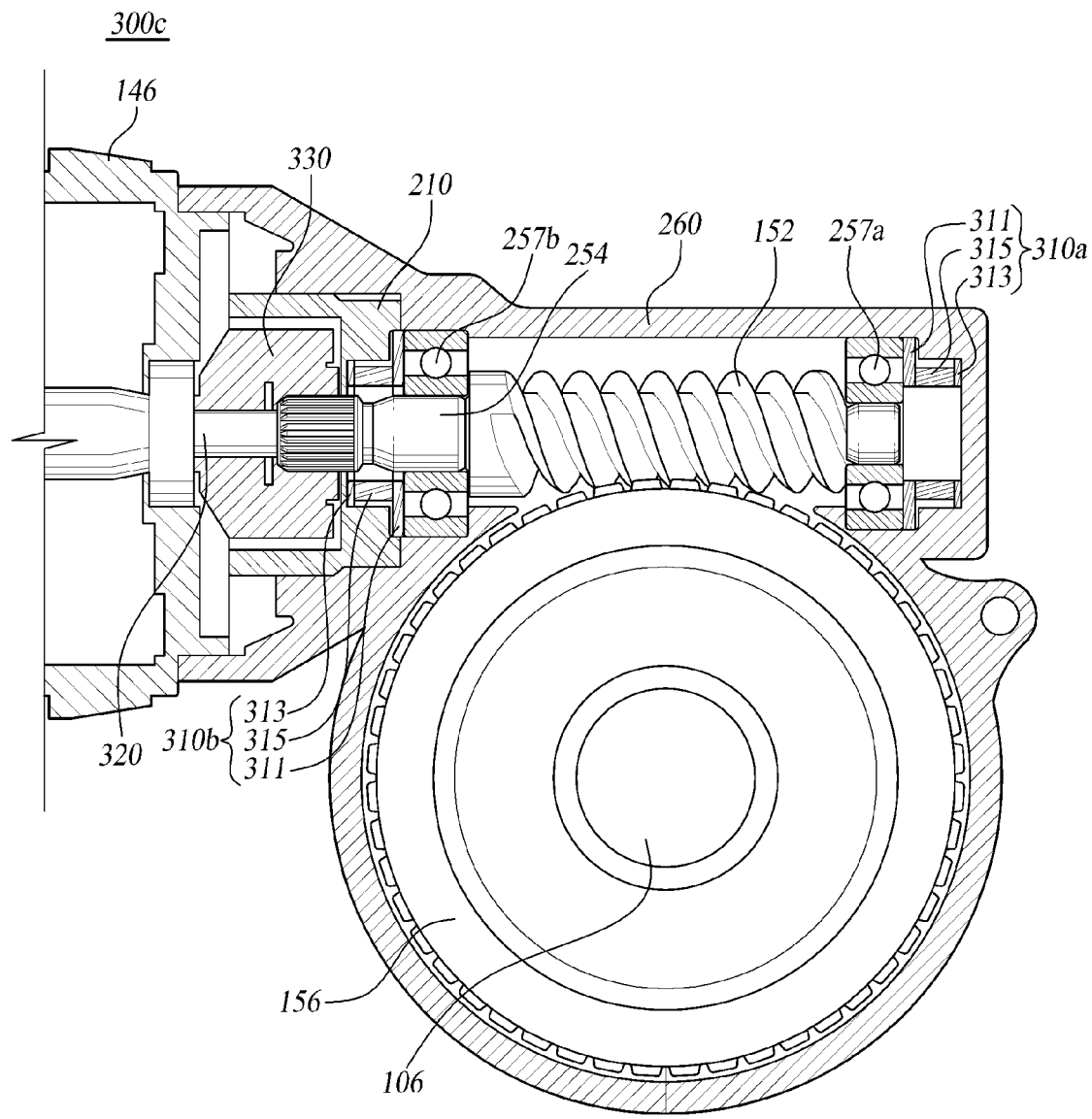
Figure 6:
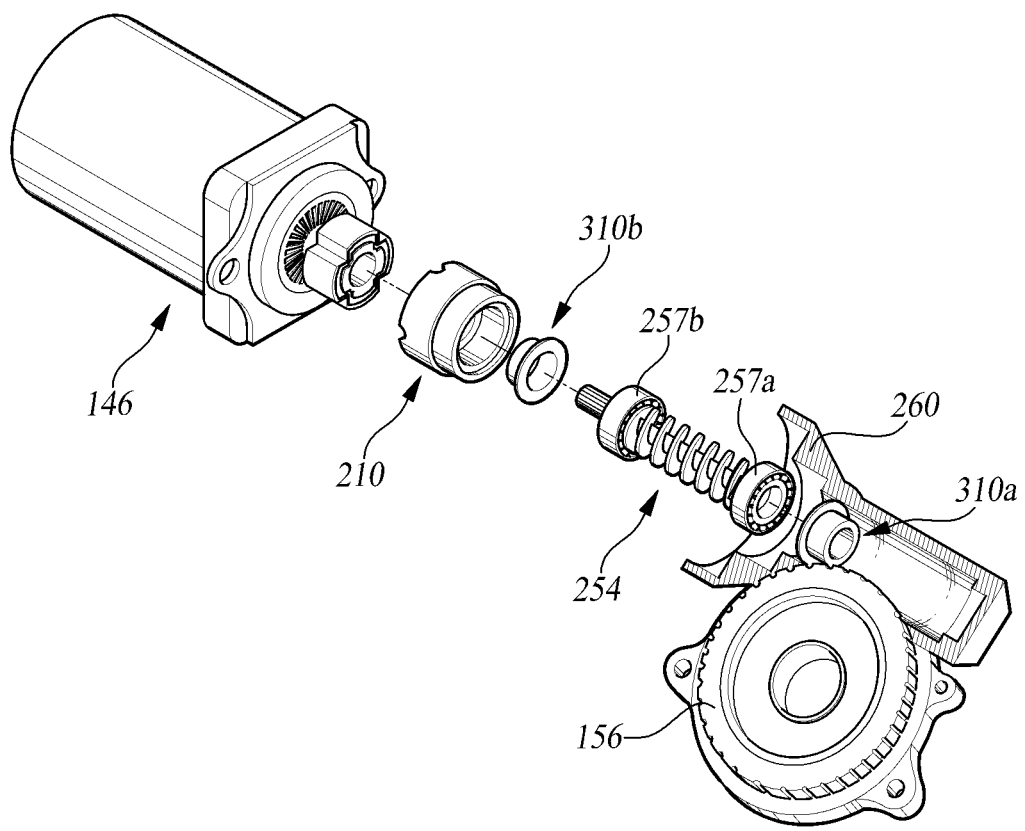
FIG. 6 is an exploded perspective view illustrating the reducer of an electric power steering apparatus according to the third embodiment of the present invention.
Figure 7:
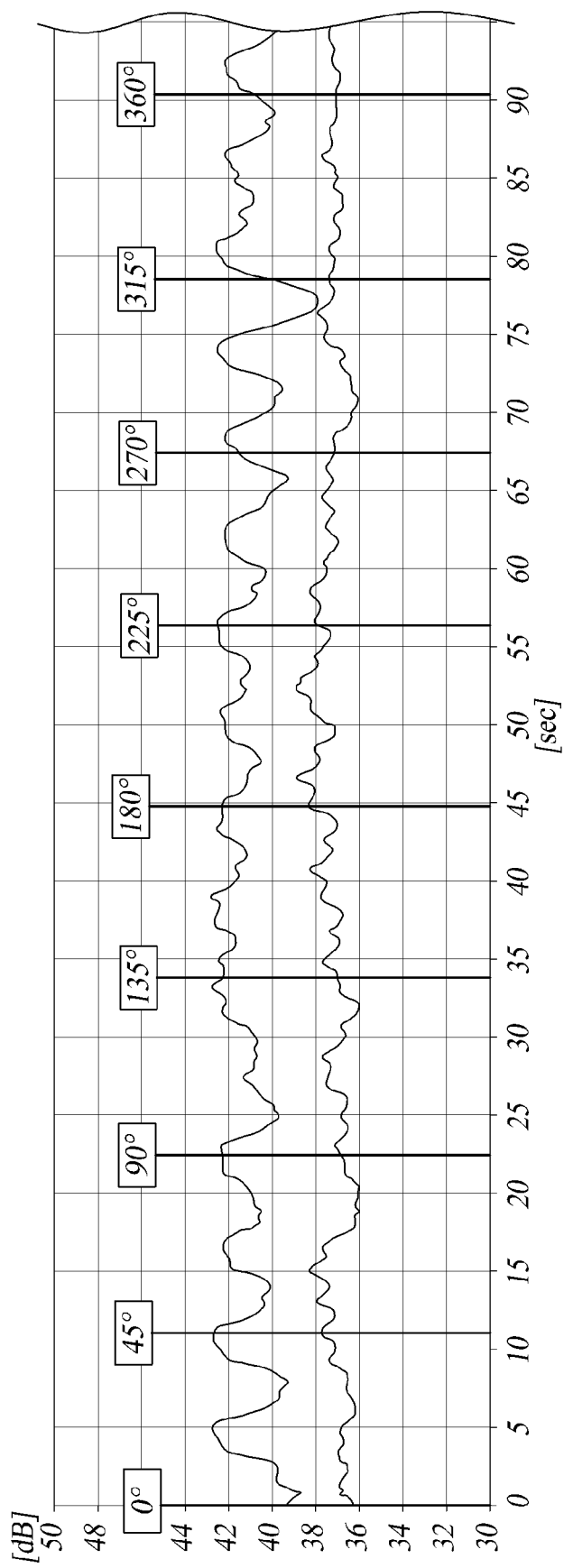
FIG. 7 is a graph in which noise generated by the reducers of an electric power steering apparatus according to the embodiments of the present invention and noise generated by a conventional reducer of an electric power steering apparatus are compared.

FIGS. 3 to 5 are sectional views illustrating reducers of an electric power steering apparatus according to the first to third embodiments of the present invention. FIG. 6 is an exploded perspective view illustrating the reducer of an electric power steering apparatus according to the third embodiment of the present invention. FIG. 7 is a graph in which noise generated by the reducers of an electric power steering apparatus according to the embodiments of the present invention and noise generated by a conventional reducer of an electric power steering apparatus are compared.

The reducer 300a of an electric power steering apparatus according to the first embodiment of the present invention includes: a pair of worm shaft bearings 275a and 275b coupled respectively to opposite ends of a worm shaft 254 and configured to support rotation of the worm shaft 254 such that vibrations and noise generated by friction and wear during the operations of the worm shaft 254 and a worm wheel 156 are absorbed; a gear housing 260 configured to accommodate a gear mechanism including the worm shaft 254, the worm shaft bearings 257a and 257b, and the worm wheel 156; and a housing damper 310a coupled to one of the worm shaft bearings 257a coupled to an end of the worm shaft 254 opposite to a connecting portion of a motor shaft 320 and an inner wall of the gear housing 260 between them and configured to support an outer race of the worm shaft bearing 275a with an axial resilient force.

The reducer 300b of an electric power steering apparatus according to the second embodiment of the present invention includes: a pair of worm shaft bearings 275a and 275b coupled respectively to opposite ends of a worm shaft 254 and configured to support rotation of the worm shaft 254 such that vibrations and noise generated by friction and wear during the operations of the worm shaft 254 and a worm wheel 156 are absorbed; a gear housing 260 configured to accommodate a gear mechanism including the worm shaft 254, the worm shaft bearings 257a and 257b, and the worm wheel 156; and a plug damper 310a coupled to one of the worm shaft bearings 257b coupled to an end of the worm shaft 254 on the side of a connecting portion of a motor shaft 320 and a plug bolt 210 coupled to the worm shaft 254 between them and configured to support an outer race of the worm shaft bearing 275b with an axial resilient force.

The reducer 300c of an electric power steering apparatus according to the third embodiment of the present invention includes: a plug damper 310a coupled to one of the worm shaft bearings 257b coupled to an end of the worm shaft 254 on the side of a connecting portion of a motor shaft 320 and a plug bolt 210 coupled to the worm shaft 254 between them and configured to support an outer race of the worm shaft bearing 275b with an axial resilient force, in addition of the structure of the reducer 300a according to the first embodiment of the present invention.

Balls are provided the inner and outer races of the worm shaft bearings 275a and 275b respectively coupled to end of the worm shaft 254 opposite to a connecting portion of the motor shaft 320 and an end of the worm shaft 254 on the side of a connecting portion of the motor shaft 320 to support rotation of the worm shaft 254.

The reducers 300a, 300b, and 300c are adapted to assist a steering force of the driver by rotating the steering shaft 106 by a driving force of the motor 146 with the worm 152 and the worm wheel 156 being interlocked with each other. The worm shaft bearings 257a and 257b are engaged with opposite ends of the worm shaft 254 interlocked with the motor shaft 320 during driving of the motor 146 to support rotation of the worm shaft 254 and the steering shaft 105 and the gear mechanism including the interlocked worm wheel 156, worm shaft bearings 257a and 257b, and worm 152 are embedded in the gear housing 260.

The worm shaft bearings 257a and 257b are mounted to the inner side of the gear housing 260 to support rotation of the worm shaft 254 at opposite ends of the worm shaft 254 and reduce a rotational resistance of the worm shaft 254. A coupling portion between the worm shaft 254 and the motor shaft 320 is a coupling portion of two shafts by means of a motor boss or the damper coupler 330 and the plug bolt 210 where a manufacturing error and an assembling error are accumulated and a bearing is caught to a high degree, causing the rotational resistance of the worm shaft 254 to be increased.

When an external force transmitted from a road surface to the wheels and the steering shaft 106 is transmitted to the worm wheel 156, the worm shaft 254 enmeshed with the worm wheel 156 is not only deformed in the axial direction thereof but is resiliently distorted at a certain angle from the axial direction.

Thus, the housing damper 310a is coupled to an end of the worm shaft 254 opposite to a coupling portion of the motor shaft 320 in the first embodiment of the present invention, the plug damper 310b is coupled to an end of the worm shaft 254 on the side of a coupling portion of the motor shaft 320, and the housing damper 310a and the plug damper 310b are coupled to opposite ends of the worm shaft 254 in the third embodiment of the present invention, so that an external force transmitted through the worm wheel 156 and vibrations and noise generated by friction and wear during the operations of the worm 152 and the worm wheel 156 can be absorbed.

The housing damper 310a is adapted to absorb vibrations and noise generated when the worm wheel 156 rotated in association with manipulation of the steering wheel by the driver and the worm shaft 254 enmeshed with the worm wheel 156 are operated in the forward or reverse direction, and is coupled to the worm shaft bearing 257a coupled to an end of the worm shaft 254 opposite to a coupling portion of the motor shaft 320 and an inner wall of the gear housing 260 between them.

That is, when one side of the housing damper 310a is fixed to and supported by the gear housing 260, it supports an outer race of the worm shaft bearing 257a in the axial direction of the opposite side thereof with a resilient force, absorbing transmitted vibrations and noise.

The housing damper 310a has a first support body 311, a second support body 313, and a resilient support body 315 as a whole. The first support body 311 supports an outer race of the worm shaft bearing 257a, the second support body 313 is supported by the plug bolt, and the resilient support body 315 is coupled to the first support body 311 and the second support body 313 between them to absorb vibrations and noise transmitted from the first support body 311 and the second support body 313 while being compressed or relaxed to be resiliently deformed in the axial direction or at an angle from the axial direction.

In the housing damper 310a, the first support body 311, the second support body 313, and the resilient support body 315 are integrally formed by injection-molding the fused material of the resilient support body 315 between the first support body 311 and the second support body 313. The housing damper 310a may have an annular shape to be easily deformed and to absorb noise.

That is, the outer diameter of the second support body 313 is formed to be smaller than the outer diameter of the first support body 311 with the first support body 311 and the second support body 313 having annular shapes, and the resilient support body 315 is coupled to the first support body 311 and the second support body 313 between them. Then, it is apparent that the inner surfaces of the first support body 311 and the second support body 313 may be communicated with each other and the first support body 311, the second support body 313, and the resilient support body 315 may be integrally formed by injection molding.

Meanwhile, the second embodiment of the present invention has the same configuration as the first embodiment of the present invention except for the housing damper 310a, and the plug damper 310b is coupled to the worm shaft bearing 257b coupled to an end of the worm shaft 254 on the side of the motor shaft 320 between them.

One side of the plug damper 310b is fixed to and supported by the plug bolt 210 such that a resilient force of the plug damper 310b supports an outer race of the worm shaft bearing 257b in the opposite axial direction, absorbing transmitted vibrations and noise.

The size of the plug damper 310b may be variously determined such that the plug damper 310b is coupled to the plug bolt 210, but since its shape, structure, material, manufacturing method, and vibration/noise absorbing effect are the same as those of the housing damper 310, a detailed description thereof will be omitted.

The reducer 300c according to the third embodiment of the present invention includes both the housing damper 310a of the first embodiment and the plug damper 310b of the second embodiment.

That is, the housing damper 310a is coupled to the worm shaft bearing 257a coupled to an end of the worm shaft 254 opposite to a coupling portion of the motor shaft 320 and an inner wall of the gear housing 260 between them to support an outer race of the worm shaft bearing 257a with an axial resilient force, and the plug damper 310b is coupled to the worm shaft bearing 257b coupled to an end of the worm shaft 254 on the side of a coupling portion of the motor shaft 320 to support an outer race of the worm shaft bearing 257b with an axial resilient force.

Thus, the housing damper 310a and the plug damper 310b are adapted to absorb vibrations and noise generated when the worm wheel 156 is rotated in the forward or reverse direction in association with manipulation of the steering wheel by the driver, they can simultaneously absorb vibrations and noise transmitted to the opposite axial ends of the worm shaft 254 with the worm wheel 156 being enmeshed with the worm shaft 254.

Here, it is apparent that the sizes of the housing damper 310a and the plug damper 310b may be variously determined, but since its shape, structure, material, manufacturing method, and vibration/noise absorbing effect are the same as in the first and second embodiments of the present invention.

Meanwhile, the reducers according to the first to third embodiments of the present invention constitute an electric power steering apparatus adapted to assist a steering force of a steering wheel by means of a motor 146 (see FIG. 1) when combined with a steering shaft 106 connected to the steering wheel, a steering column 130 (see FIG. 1) configured to fix the steering shaft to the chassis, a rack/pinion mechanism 110 (see FIG. 1) including a rack gear and a pinion gear and configured to convert a rotational movement of the steering shaft 106 to a linear movement, and a rack bar 112 (see FIG. 1) whose opposite ends are equipped with a tie rod 122 and a knuckle arm 124 respectively.

Here, the resilient support body 315 may be formed of one of resilient materials such as natural rubber (NR), nitride butadiene rubber (NBR), chloroprene rubber (CR), ethylene propylene terpolymer (EPDM), fluro elasomer (FPM), stylene butadine rubber (SBR), chlorosulphonated polyethylene (CSM), and silicon for weather resistance and flexibility, and may also be formed of one of engineering plastic materials such as poly acetal (POM), poly amide (PA), poly carbonate (PC), polyimide (PI), and poly butylene terephthalate (PBT) for deflection, strength, and low flexibility due to heat, as well as wear resistance and low friction. Further, it may be formed of a mixture of them.

When the rattle noise generated by the reducers of the first to third embodiments of the present invention is compared with that of the conventional reducer, as illustrated in FIG. 7, the maximum noise in a periodic pattern formed according to the rotation angle of a worm shaft on a time axis reaches 42 to 43 dB in the conventional reducer, but the maximum noise of the reducer according to the present invention remains 38 to 39 dB (see the lower line of FIG. 7) which is lower than that of the conventional reducer by 3 to 5 dB. Further, the maximum noise of the reducer according to the present invention is lower than 40 dB at which the driver starts to feel noise, allowing the driver to feel an improved steering operation.

Figure 8:
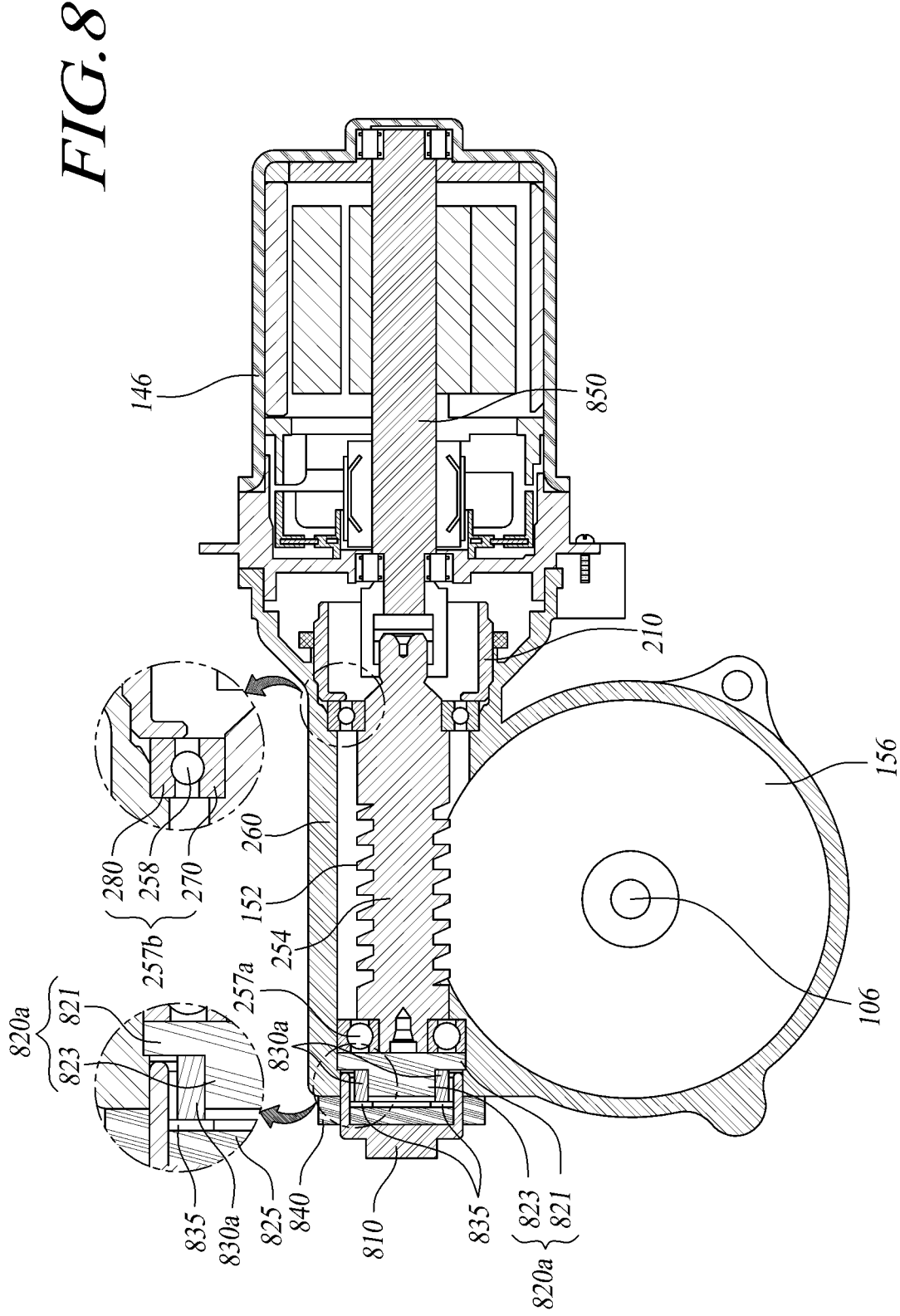
FIG. 8 is a sectional view illustrating a reducer of an electric power steering apparatus according to the fourth embodiment of the present invention.
Figure 9:
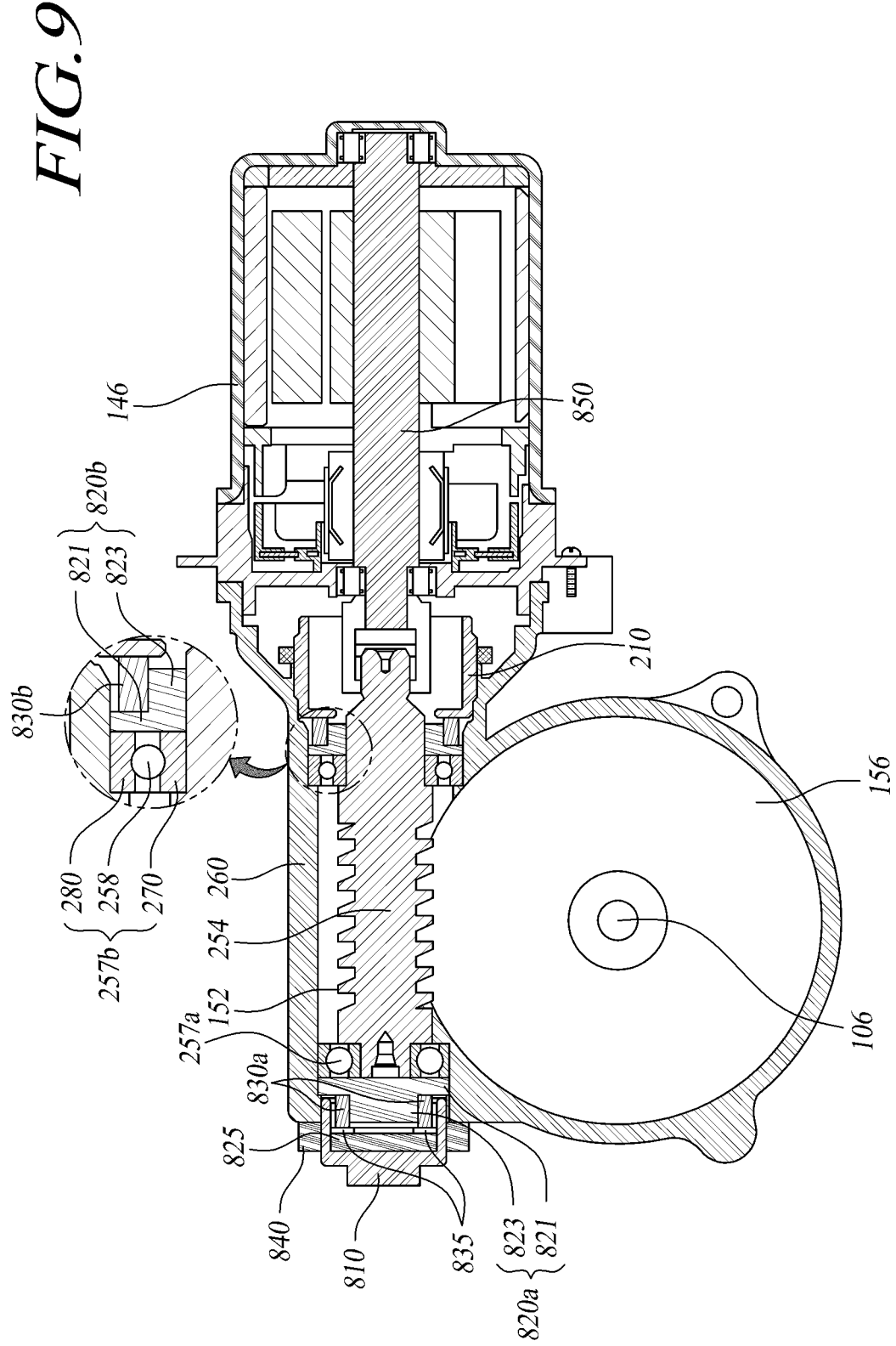
FIG. 9 is a sectional view illustrating a reducer of an electric power steering apparatus according to the fourth embodiment of the present invention.
Figure 10:
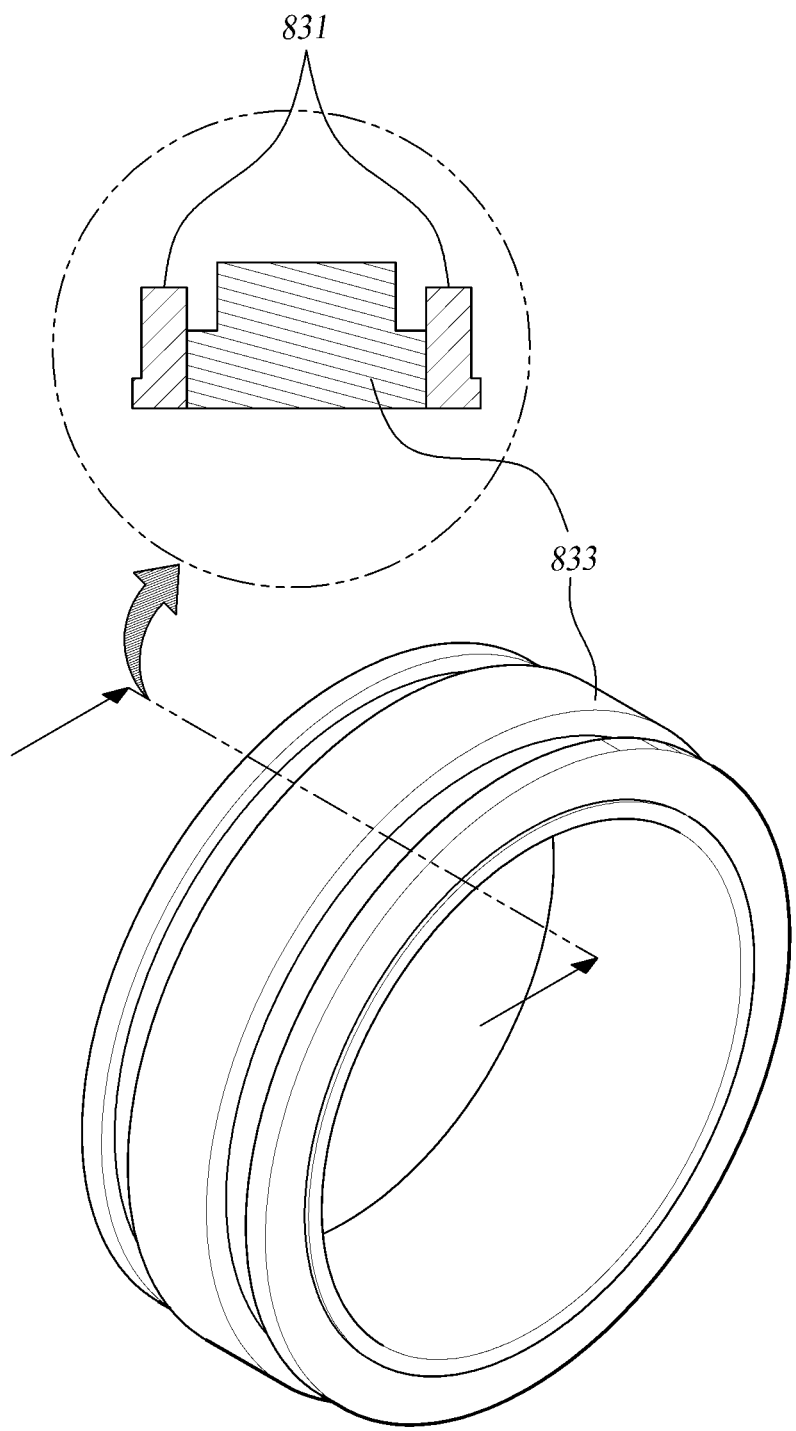
FIGS. 10 to 12 are perspective views illustrating dampers of the reducers of an electric power steering apparatus according to the fourth and fifth embodiments of the present invention.
Figure 11:
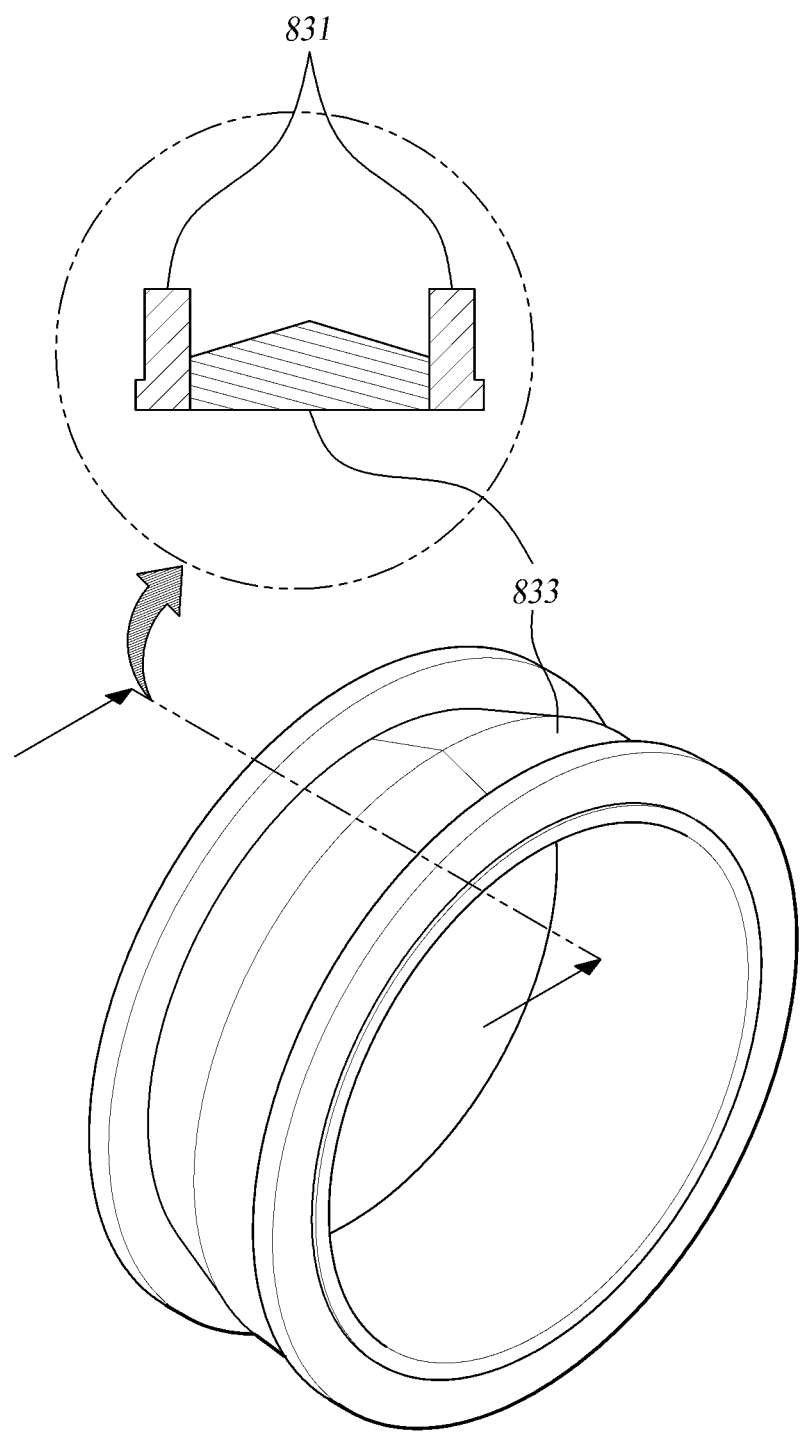
Figure 12:
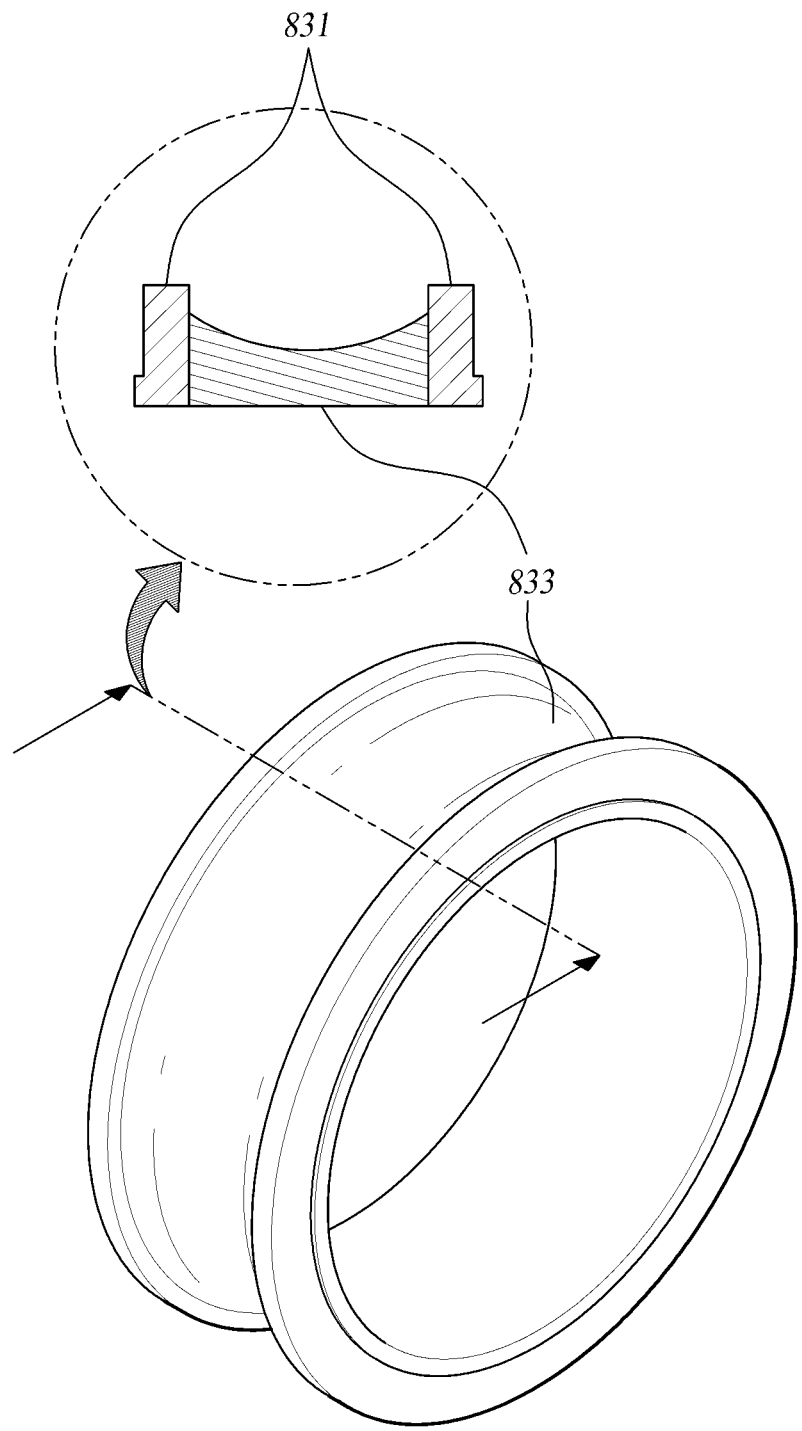

FIG. 8 is a sectional view illustrating a reducer of an electric power steering apparatus according to the fourth embodiment of the present invention. FIG. 9 is a sectional view illustrating a reducer of an electric power steering apparatus according to the fourth embodiment of the present invention. FIGS. 10 to 12 are perspective views illustrating dampers of the reducers of an electric power steering apparatus according to the fourth and fifth embodiments of the present invention.

As illustrated in FIG. 8, the reducer of an electric power steering apparatus according to the fourth embodiment of the present invention includes: a guide 820a configured to axially support a worm shaft bearing 257a coupled to an end of a worm shaft 254 opposite to a coupling portion of a motor shaft 850 to absorb vibrations and noise generated when the worm shaft 254 is moved axially or resiliently distorted by a certain angle; a guide damper coupled to the guide 820 and configured to provide the guide 820 with an axial resilient force; and an adjusting plug 810 coupled to one side of a gear housing 260 so as to pass through the gear housing 260 and configured to adjust a support force of the guide damper 830a while axially supporting the guide damper 830a.

The reducer of the fifth embodiment of the present invention illustrated in FIG. 9 further includes an auxiliary guide 820b configured to axially support a worm shaft bearing 257b coupled to an end of the worm shaft 254 on the side of a coupling portion of the motor shaft 850, and an auxiliary damper 830b configured to provide the auxiliary guide 820b with a resilient force.

Balls 258 are provided between the inner races 270 and outer races 280 of the worm shaft bearings 257a and 257b respectively coupled to ends of the worm shaft 254 on the side of a coupling portion of the motor shaft 850 and opposite to the motor shaft 850 to support rotation of the worm shaft 254.

The reducer is adapted to assist a steering force of the driver by rotating the steering shaft 106 by a driving force of the motor 146 with the worm 152 and the worm wheel 156 being interlocked with each other. The worm shaft bearings 257a and 257b are engaged with opposite ends of the worm shaft 254 interlocked with the motor shaft 850 during driving of the motor 146 to support rotation of the worm shaft 254, and the steering shaft 105 and the interlocked worm wheel 156 and worm 152 are embedded in the gear housing 260.

The worm shaft bearings 257a and 257b are mounted to the inner side of the gear housing 260 to support rotation of the worm shaft 254 at opposite ends of the worm shaft 254 and reduce a rotational resistance of the worm shaft 254. A coupling portion between the worm shaft 254 and the motor shaft 850 is a coupling portion of two shafts by means of a damper coupler or a motor boss and a plug bolt where a manufacturing error and an assembling error are accumulated and a bearing is caught to a high degree, causing the rotational resistance of the worm shaft 254 to be increased.

When an external force transmitted from a road surface to the wheels and the steering shaft 106 is transmitted to the worm wheel 156, the worm shaft 254 enmeshed with the worm wheel 156 is not only deformed in the axial direction thereof but is resiliently distorted at a certain angle from the axial direction.

The fourth embodiment of the present invention illustrated in FIG. 8 includes the guide 820a, the guide damper 830a, and the adjusting plug 810 at an end of the worm shaft 254 opposite to a coupling portion of the motor shaft 850 and the fifth embodiment of the present invention illustrated in FIG. 9 further includes the auxiliary guide 820b, the auxiliary damper 830b, etc. at an end of the worm shaft 254 on the side of a coupling portion of the motor shaft 850, so that an external force transmitted through the worm wheel 156 and vibrations and noise generated by friction and wear during the operations of the worm 152 and the worm wheel 156 can be absorbed when the worm shaft 254 is axially moved or is distorted at a certain angle from the axial direction.

The guide 820a and the auxiliary guide 820b are coupled to the outer sides of the worm shaft bearings 257a and 257b coupled to ends of the worm shaft 254 to axially support the outer races of the worm shaft bearings 257a and 257b, and each of which includes a large diameter portion 821 configured to support the outer races of the worm shaft bearings 257a and 257b and a small diameter portion 823 the diameter of which is smaller than the large diameter portion 821.

First, in the fourth embodiment of the present invention, the guide damper 830a configured to provide the guide 820a with an axial resilient force is inserted into the outer peripheral side of the small diameter portion 823 of the guide 820a, and the guide 820a is resiliently supported in the direction of the worm shaft bearing 257 with a resilient force of the guide damper 830a generated by a pushing force of the adjusting plug 810 press-fitted or screw-coupled to the gear housing 260, allowing vibrations and noise transmitted through the worm shaft 254 to be absorbed.

The guide damper 830a has a hollow shape mounted on the small diameter portion 823 of the guide 820a, and may include support members 831 located at opposite ends thereof and a hollow resilient body 833 provided between the support members 831. The support members 831 and the resilient body 833 may be integrally formed by injection-molding the fused material of the resilient body 833 between the support bodies 831 at the opposite ends of the guide damper 830a.

The resilient body 833 has various shapes as illustrated in FIGS. 10 to 12 to be resiliently deformed easily when a load is transmitted at a certain angle from the axial direction of the worm shaft 254 as well as in the axial direction of the worm shaft 254.

That is, as illustrated in FIG. 10, opposite side surfaces of the inner diameter portion are attached to side surfaces of the support member 831 and opposite side surfaces of the outer diameter portion are spaced apart from side surfaces of the support member 831 so as to form spaces, allowing the support members to be resiliently deformed toward the outer diameter portion easily when the support member is moved in the axial direction of the worm shaft 254 or is resiliently deformed at a certain angle from the axial direction to absorb vibrations and noise.

As illustrated in FIG. 11, opposite side surfaces of the inner diameter portion may be attached to side surfaces of the support member 831 and the diameter of the outer diameter portion may become larger as it goes from the side surfaces of the inner diameter portion toward the center thereof. In addition, as illustrated in FIG. 12, opposite side surfaces of the inner diameter portion may be attached to side surfaces of the support member 831 and the diameter of the outer diameter portion may become smaller as it goes from the side surfaces of the inner diameter portion toward the center thereof.

The adjusting plug 810 configured to axially support the guide damper 830a is coupled to one side of the gear housing 260 so as to pass through the gear housing 260, press-fitted to the gear housing to adjust a resilient support force of the guide damper 830a and thus adjust the compressed degree of the guide damper 830, or screw-coupled to the gear housing 260 having a screw root coupled to a screw thread formed on the outer peripheral surface of the adjusting plug 810.

Thus, as the adjusting plug 810 is moved in the axial direction of the worm shaft 254 according to the coupled degree of the adjusting plug 810 and the gear housing 260, it can adjust the compressed degree of the guide damper 830a, and thus a resilient support force of the guide damper 830a. Meanwhile, the present invention is not limited to it but the adjusting plug 810 may be coupled to the gear housing 260 using a lock nut 340 having a screw root on the inner peripheral surface thereof without machining a screw root on the gear housing 260.

The reducer according to the fifth embodiment of the present invention has the same structure and shape as those of the fourth embodiment of the present invention except that the auxiliary guide 820b coupled to a coupling portion of the worm shaft 254 to the motor shaft 850 has a hollow portion on the inner side thereof so that the worm shaft 254 is inserted into the hollow portion and the auxiliary damper 830b has the same structure and shape as those of the guide damper 830a, and a detailed description thereof will be omitted.

Meanwhile, in the reducer according to the fourth embodiment of the present invention, a bush 835 configured to support resilient deformation of the guide damper 830a may be provided between the guide damper 830a and the adjusting plug 810 and a spacer 825 formed of a resilient material having a resiliency larger than that of the guide damper 830a may be provided between the bush 835 and the adjusting plug 810.

Thus, rattle noise generated by external forces having various shapes can be absorbed by axially coupling the guide damper 830a and the spacer 825 having different resiliencies.

That is, when a high load is transmitted instantaneously while a resilient force of the guide damper 830a is supporting a low load, the guide damper 830a mainly absorbs the loads but the spacer 825 and the guide damper 830a simultaneously support the high load, absorbing vibrations and noise and thus preventing the rattle noise.

In this way, the dampers 830a and 830b, the guide 820a, and the auxiliary guide 820b are coupled to opposite ends of the worm shaft 254 and the adjusting plug 810 coupled to the gear housing 260 can adjust a resilient force of the guide damper 830a, absorbing an external force transmitted from a road surface through the steering shaft 106 and the worm wheel 156 and vibrations and noise generated during the operations of the worm 153 and the worm wheel 156 and thus reducing rattle noise generated in the reducer.

Here, since the resilient body 833 and the spacer 825 of the dampers 830a and 830b are required to include sufficient deformability and strength as well as wear resistance and low friction and to be formed of a less flexible material, and is formed of one of engineering plastic materials such as poly acetal (POM), poly amide (PA), poly carbonate (PC), polyimide (PI), and poly butylene terephthalate (PBT) or is formed of one of resilient materials such as natural rubber (NR), nitride butadiene rubber (NBR), chloroprene rubber (CR), ethylene propylene terpolymer (EPDM), fluro elasomer (FPM), stylene butadine rubber (SBR), chlorosulphonated polyethylene (CSM), and silicon for weather resistance and flexibility.

Meanwhile, the reducers according to the first to third embodiments of the present invention constitute an electric power steering apparatus adapted to assist a steering force of a steering wheel by means of a motor 146 (see FIG. 1) when combined with a steering shaft 106 connected to the steering wheel, a steering column 130 (see FIG. 1) configured to fix the steering shaft to the chassis, a rack/pinion mechanism 110 (see FIG. 1) including a rack gear and a pinion gear and configured to convert a rotational movement of the steering shaft to a linear movement, and a rack bar 112 (see FIG. 1) whose opposite ends are equipped with a tie rod and a knuckle arm respectively.

The reducers according to the embodiments of the present invention having the above-described shapes and structures reduce rattle noise generated by a backlash increased due to friction and wear of a worm and a worm wheel or generated by an impact transmitted from a road surface through wheels and a steering shaft, and enhance a steering feeling of the driver by improving the catching phenomenon and rotational resistance generated between a worm shaft and a worm shaft bearing.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A reducer of an electric power steering apparatus adapted to absorb vibrations and noise generated by friction and wear during operations of a worm shaft and a worm wheel, comprising:
   a pair of worm shaft bearings coupled respectively to opposite ends of a worm shaft and configured to support rotation of the worm shaft;
   a gear housing configured to accommodate a gear mechanism including the worm shaft, the worm shaft bearings, and the worm wheel; and
   a housing damper to one of the worm shaft bearings coupled to an end of the worm shaft opposite to a connecting portion of a motor shaft and an inner wall of the gear housing therebetween and configured to support an outer race of the worm shaft bearing with an axial resilient force,
   wherein the housing damper includes an inner surface defining a hole extending through the housing damper.

2. The reducer of an electric power steering apparatus as claimed in claim 1, wherein the housing damper includes a first support body configured to support the outer race of the worm shaft bearing, a second support body supported by the gear housing, and a resilient support body coupled to the first support body and the second support body therebetween.

3. The reducer of an electric power steering apparatus as claimed in claim 2, wherein, in the housing damper, the first support body has an annular shape and the second support body has an annular shape whose outer diameter is smaller than that of the first support body and wherein the resilient support body is coupled to the first support body and the second support body therebetween such that inner peripheral surfaces of the first support body and the second support body are communicated with each other.

4. The reducer of an electric power steering apparatus as claimed in claim 3, wherein, in the housing damper, the first support body, the second support body, and the resilient support body are integrally formed.

5. The reducer of an electric power steering apparatus as claimed in claim 4, wherein, in the housing damper, the first support body, the second support body, and the resilient support body are integrally formed by injection-molding a fused material of the resilient support body between the first support body and the second support body.

6. The reducer of an electric power steering apparatus as claimed in claim 1, further comprising a plug damper coupled to one of the worm shaft bearings coupled to an end of the worm shaft on the side of a connecting portion of a motor shaft and a plug bolt coupled to the worm shaft therebetween and configured to support an outer race of the worm shaft bearing with an axial resilient force.

7. The reducer of an electric power steering apparatus as claimed in claim 6, wherein the plug damper includes a first support body configured to support the outer race of the worm shaft bearing, a second support body supported by the plug bolt, and a resilient support body coupled to the first support body and the second support body therebetween.

8. The reducer of an electric power steering apparatus as claimed in claim 7, wherein, in the plug damper, the first support body has an annular shape and the second support body has an annular shape whose outer diameter is smaller than that of the first support body and wherein the resilient support body is coupled to the first support body and the second support body therebetween such that inner peripheral surfaces of the first support body and the second support body are communicated with each other.

9. The reducer of an electric power steering apparatus as claimed in claim 7, wherein, in the plug damper, the first support body, the second support body, and the resilient support body are integrally formed by injection-molding a fused material of the resilient support body between the first support body and the second support body.

10. The reducer of an electric power steering apparatus as claimed in claim 1, wherein the inner surface is arranged radially, relative to a rotational axis of an inner race of the worm shaft bearing, outward of an inner surface of the inner race.

11. A reducer of an electric power steering apparatus adapted to absorb vibrations and noise generated by friction and wear during operations of a worm shaft and a worm wheel, comprising:
    a pair of worm shaft bearings coupled respectively to opposite ends of a worm shaft and configured to support rotation of the worm shaft;
    a gear housing configured to accommodate a gear mechanism including the worm shaft, the worm shaft bearings, and the worm wheel; and
    a plug damper coupled to one of the worm shaft bearings coupled to an end of the worm shaft on the side of a connecting portion of a motor shaft and a plug bolt coupled to the worm shaft therebetween and configured to support an outer race of the worm shaft bearing with an axial resilient force.

12. The reducer of an electric power steering apparatus as claimed in claim 11, wherein the plug damper includes a first support body configured to support the outer race of the worm shaft bearing, a second support body supported by the plug bolt, and a resilient support body coupled to the first support body and the second support body therebetween.

13. The reducer of an electric power steering apparatus as claimed in claim 12, wherein, in the plug damper, the first support body, the second support body, and the resilient support body are integrally formed by injection-molding a fused material of the resilient support body between the first support body and the second support body.

14. The reducer of an electric power steering apparatus as claimed in claim 11, wherein the plug damper includes an inner surface defining a hole extending through the plug damper.

15. The reducer of an electric power steering apparatus as claimed in claim 14, wherein the inner surface is arranged radially, relative to a rotational axis of an inner race of the worm shaft bearing, outward of an inner surface of the inner race.

* * * * *